US008644169B2

(12) United States Patent
Cioffi et al.

(10) Patent No.: US 8,644,169 B2
(45) Date of Patent: Feb. 4, 2014

(54) METHODS AND APPARATUS TO PERFORM LINE TESTING AT CUSTOMER PREMISES

(75) Inventors: John M Cioffi, Atherton, CA (US); George Ginis, San Matco, CA (US); Peter J. Silverman, Evanston, IL (US); Bin Lee, Palo Alto, CA (US); Richard Dennis Hart, Concord, CA (US)

(73) Assignees: Adaptive Spectrum and Signal Alignment, Inc., Redwood City, CA (US); AT&T Intellectual Property I, L.P., Reno, NV (US)

( * ) Notice: Subject to any disclaimer, the term of this patent is extended or adjusted under 35 U.S.C. 154(b) by 1066 days.

(21) Appl. No.: 12/226,939

(22) PCT Filed: Apr. 27, 2007

(86) PCT No.: PCT/US2007/067718
§ 371 (c)(1),
(2), (4) Date: Feb. 17, 2009

(87) PCT Pub. No.: WO2007/130878
PCT Pub. Date: Nov. 15, 2007

(65) Prior Publication Data
US 2009/0168972 A1    Jul. 2, 2009

Related U.S. Application Data

(60) Provisional application No. 60/796,371, filed on May 1, 2006.

(51) Int. Cl.
*H04L 12/26* (2006.01)

(52) U.S. Cl.
USPC ..... 370/248; 370/249; 379/22.01; 379/27.04; 379/27.01; 379/27.02; 379/27.03

(58) Field of Classification Search
USPC ........... 379/22.01, 22, 27.01–27.04; 370/249, 370/248
See application file for complete search history.

(56) References Cited

U.S. PATENT DOCUMENTS

| 6,292,468 | B1 | 9/2001 | Sanderson | |
|---|---|---|---|---|
| 6,534,996 | B1 * | 3/2003 | Amrany et al. | 324/533 |
| 6,643,266 | B1 * | 11/2003 | Pugaczewski | 370/249 |
| 6,826,155 | B1 * | 11/2004 | Gershon | 370/244 |

(Continued)

FOREIGN PATENT DOCUMENTS

| DE | 102004027043 | 12/2005 |
|---|---|---|
| JP | 2005-510127 | 4/2005 |

(Continued)

OTHER PUBLICATIONS

EPO, "Office Action", European Application No. 07761535.9, Mailed Aug. 20, 2009, Whole Document.

(Continued)

*Primary Examiner* — Curtis Kuntz
*Assistant Examiner* — Thomas Maung
(74) *Attorney, Agent, or Firm* — Blakely, Sokoloff, Taylor & Zafman, LLP

(57) ABSTRACT

A data analyzer operative to be located at a customer premises, causes the transmission of a probing signal into at least one telephone line. The data analyzer computes a parameter that represents a characteristic of at least one telephone line based upon at least a measured reflected probing signal.

19 Claims, 7 Drawing Sheets

(56) References Cited

U.S. PATENT DOCUMENTS

| | | | |
|---|---|---|---|
| 6,934,655 B2* | 8/2005 | Jones et al. | 702/108 |
| 2002/0114383 A1* | 8/2002 | Belge et al. | 375/222 |
| 2003/0048756 A1* | 3/2003 | Chang et al. | 370/252 |
| 2003/0147506 A1* | 8/2003 | Kamali et al. | 379/22.02 |
| 2005/0089114 A1* | 4/2005 | Johansson et al. | 375/285 |

FOREIGN PATENT DOCUMENTS

| | | |
|---|---|---|
| JP | 2006-33012 | 2/2006 |
| JP | 2006-507783 | 3/2006 |
| WO | WO-00/41332 | 7/2000 |
| WO | WO-0041332 | 7/2000 |
| WO | WO-03044979 | 5/2003 |

OTHER PUBLICATIONS

Patent Ccoperation Treaty, "International Preliminary Report on Patentability", PCT Application No. PCT/US2007/067718, dated Nov. 13, 2008.

Patent Cooperation Treaty, "International Search Report and Written Opinion", PCT Application No. PCT/US2007/067718, (May 2, 2008).

Patent Cooperation Treaty, International Search Report and Written Opinion, PCT Application No. PCT/US2007/067718, (May 2, 2008).

Patent Cooperation Treaty, International Preliminary Report on Patentability, PCT Application No. PCT/US2007/067718, (Nov. 13, 2008).

Non-Final Office Action for Australian Patent Application No. 2007248256 Mailed Oct. 25, 2010, 2 Pages.

Non-Final Office Action for Chinese Patent Application No. 200780021490.1, Mailed Aug. 26, 2011, 9 pages.

Office Action for Japanese Patent Application No, 2009-509980, Mailed Feb. 21, 2012.

Non-Final Office Action for Chinese Patent Application No. 200780021490.1, Mailed Jul. 4, 2012.

Notice of Allowance forAustralian Patent Application No. 2007248256, Mailed Jul. 6, 2012.

Non-Final Office Action for Japanese Patent Application No. 2009-509980, Mailed Oct. 30, 2012.

Bernstein, Jeff, et al., "CPE WAN Management Protocol", Technical Report, DSL Forum, TR-069, May 2004, Produced by DSL Home-Technical Working Group, pp. 1-90.

Non-Final Office Action for Chinese Patent Application No. 200780021490.1, Mailed Feb. 18, 2013.

Non-Final Office Action for Chinese Patent Application No. 200780021490.1, Mailed Jul. 1, 2013.

* cited by examiner

METHODS AND APPARATUS TO PERFORM LINE TESTING AT CUSTOMER PREMISES

RELATED APPLICATIONS

This patent application claims priority from U.S. Provisional Application Ser. No. 60/796,371, entitled "DSL System" which was filed on May 1, 2006. U.S. Provisional Application Ser. No. 60/796,371 is hereby incorporated by reference in its entirety.

CROSS REFERENCE TO RELATED APPLICATIONS

This application is a U.S. National Phase application under 35 U.S.C. §371 of International Application No. PCT/US2007/067718, filed Apr. 27, 2007, entitled METHODS AND APPARATUS TO PERFORM LINE TESTING AT CUSTOMER PREMISES.

FIELD OF THE DISCLOSURE

This disclosure relates generally to communications networks and/or systems and, more particularly, to methods and apparatus to perform line testing at customer premises.

BACKGROUND

Digital subscriber line (DSL) technology is commonly utilized to provide internet-related services to subscribers, such as, for example, homes and/or businesses (also referred to herein as users and/or customers). DSL technology enables customers to use telephone lines (e.g., ordinary twisted-pair copper telephone lines used to provide Plain Old Telephone System (POTS) services) to connect the customers to, for example, a high data rate broadband Internet network, broadband service and/or broadband content.

A service provider of a DSL service can use information such as loop length, cable gauge(s), presence of bridged tap(s), location of bridged tap(s), lengths of bridged tap(s), noise on the line, shorts, opens, etc. for trouble detection, trouble isolation and/or trouble prevention. Alternatively or additionally, it may be useful to have similar information concerning the telephone line before DSL service is offered, sold and/or provisioned to a potential DSL subscriber, from the service provider's location to the subscriber's location. Information such as that mentioned above is measured for the telephone line between the service provider's location and the subscriber's location. However, line testing equipment is typically located at a service provider's location and thus this information is typically available from the service provider's location and not from the subscriber's location.

DETAILED DESCRIPTION

Figure 1:
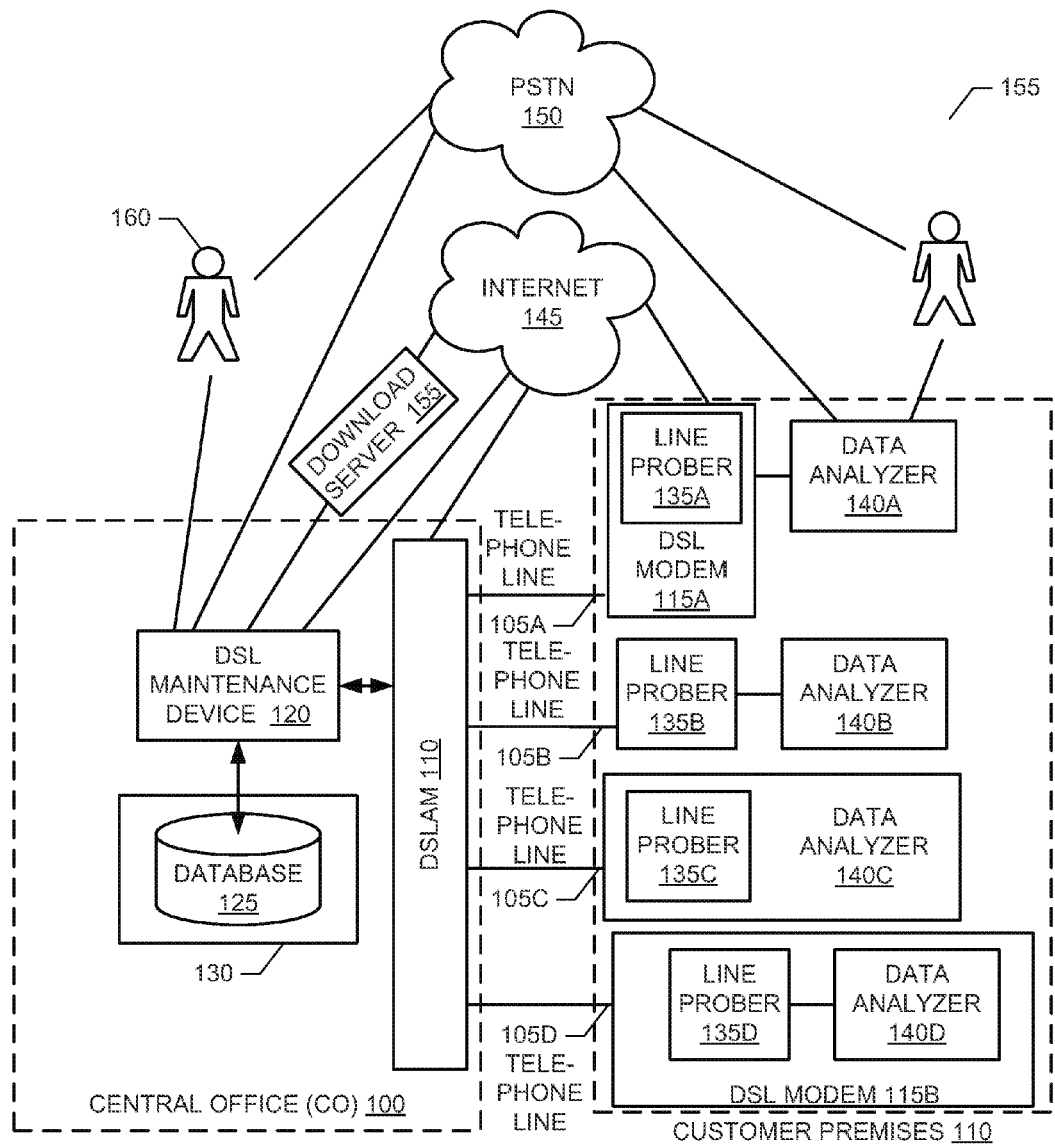
FIG. 1 is a schematic illustration of an example apparatus to perform line testing at customer premises.

A data analyzer, operative to be located at a customer premises, causes the transmission of a probing signal into at least one telephone line. The data analyzer computes a parameter that represents a characteristic of at least one telephone line based upon at least a measured reflected probing signal. Using any of a variety of method(s), technique(s) and/or algorithm(s), the data analyzers compute the characterizing parameter(s) from the measured reflected probing signal. For example, with knowledge of what probing signal was transmitted, and given a received and/or measured reflected signal, a data analyzer can, for example, compute an echo path response, detect the presence of a bridged tap, characterize a detected bridged tap, estimate a loop attenuation, and/or determine any suitable telephone line characteristic. In some circumstances, the measured reflected signals at the customer end of a telephone line will include a much greater level of detail about a customer premises environment and/or the telephone line than would be available from reflected signals at the other (e.g., CO or RT) end. Therefore, the data analyzer provides an enhanced level of detailed diagnostics by performing one or more line test(s) from the customer premises 110.

While the following disclosure references the example digital subscriber line (DSL) system and/or the example devices of FIGS. 1-8, the methods and apparatus described herein may be used to characterize telephone lines for any variety, any size and/or any topology of DSL system. For example, a DSL system may include more than one DSL access multiplexer (DSLAM) located in more than one location and may include any number of telephone lines, DSL maintenance devices, line probers, DSL modems and/or data analyzers. Also, for example, at customer premises, a plurality of modems could terminate a plurality of telephone lines and share a single or a plurality of line probers, data analyzers and/or computers. Additionally, although for purpose of explanation, the following disclosure refers to example systems, devices and/or networks illustrated in FIG. 1, any additional and/or alternative variety and/or number of communication systems, devices and/or network(s) may be used to implement a DSL communication system and/or provide DSL communication services in accordance with the teachings disclosed herein. For example, the different functions collectively allocated among a DSL maintenance device, a DSL access multiplexer (DSLAM), a DSL modem, a line prober, computer, and/or a data analyzer as described below can be reallocated in any desired manner.

As used herein, the terms "user", "subscriber" and/or "customer" refer to a person, business and/or organization to which communication services and/or equipment are and/or may potentially be provided by any of a variety of service provider(s). Further, the term "customer premises" refers to the location to which communication services are being provided by a service provider. For an example public switched telephone network (PSTN) used to provide DSL services, customer premises are located at, near and/or are associated with the network termination (NT) side of the telephone lines. Example customer premises include a residence or an office building.

As used herein, the term "operative" may describe an apparatus capable of an operation and/or actually in operation. For example, an apparatus operable to perform some function describes a device turned off yet is capable of performing an operation, by virtue of programming or hardware for example, and/or a device turned on and performing the operation. The term "signal" typically refers to an analog signal, the term "data" typically refers to digital data and the term "information" may refer to either an analog signal and/or a digital signal although other meanings may be inferred from the context of the usage of these terms.

As used herein, the term "service provider" refers to any of a variety of entities that provide, sell, provision, troubleshoot and/or maintain communication services and/or communication equipment. Example service providers include a telephone operating company, a cable operating company, a wireless operating company, an internet service provider, or any service that may independently or in conjunction with a DSL service provider offer services that diagnose or improve DSL the DSL service.

As used herein, the term "subscriber equipment" refers to any equipment located at and/or in a customer premises for use in providing at least one subscriber service. The subscriber equipment may or may not be potentially available for additional purposes. While subscriber equipment is located at and/or in a customer premises, such equipment may be located on either side and/or both sides of a NT and/or any other network ownership demarcation. Subscriber equipment may be owned, rented, borrowed and/or leased by a subscriber. Subscriber equipment may be owned and entirely controlled by the service provider. For example, subscriber equipment could be owned by a service provider and the subscriber only plugs into a connector and has no other access and/or interaction with the device. Subscriber equipment is generally available to and/or accessible by the subscriber and may be acquired and/or obtained by the subscriber via any of a variety of sources including, but not limited to, a retailer, a service provider, and/or an employer. Example subscriber equipment includes a personal computer (PC), a set-top box (STB), a residential gateway and/or a DSL modem located at and/or in a subscriber's residence by which the subscriber receives and/or utilizes a DSL service and/or Internet services.

Additionally, as used herein, the term "DSL" refers to any of a variety and/or variant of DSL technology such as, for example, Asymmetric DSL (ADSL), High-speed DSL (HDSL), Symmetric DSL (SDSL), and/or Very high-speed DSL (VDSL). Such DSL technologies are commonly implemented in accordance with an applicable standard such as, for example, the International Telecommunications Union (ITU) standard G.992.1 (a.k.a. G.dmt) for ADSL modems, the International Telecommunications Union (ITU) standard G.992.3 (a.k.a. G.dmt.bis, or G.adsl2) for ADSL2 modems, the International Telecommunications Union (ITU) standard G.992.5 (a.k.a. G.adsl2plus) for ADSL2+ modems, the International Telecommunications Union (ITU) standard G.993.1 (a.k.a. G.vdsl) for VDSL modems, the International Telecommunications Union (ITU) standard G.993.2 for VDSL2 modems, the International Telecommunications Union (ITU) standard G.994.1 (G.hs) for modems implementing handshake, and/or the ITU G.997.1 (a.k.a. G.ploam) standard for management of DSL modems.

In the interest of brevity and clarity, throughout the following disclosure references will be made to connecting a DSL modem and/or a DSL communication service to a customer. However, while the following disclosure is made with respect to example digital subscriber line (DSL) equipment, DSL services, DSL systems and/or the use of ordinary twisted-pair copper telephone lines for distribution of DSL services, it should be understood that the disclosed methods and apparatus to characterize and/or test a transmission medium for communication systems disclosed herein are applicable to many other types and/or variety of communication equipment, services, technologies and/or systems. For example, other types of systems include wireless distribution systems, wired or cable distribution systems, coaxial cable distribution systems, Ultra High Frequency (UHF)/Very High Frequency (VHF) radio frequency systems, satellite or other extra-terrestrial systems, cellular distribution systems, power-line broadcast systems and/or fiber optic networks. Additionally, combinations of these devices, systems and/or networks may also be used. For example, a combination of twisted-pair and coaxial cable connected by a balun, or any other physical-channel-continuing combination such as an analog fiber to copper connection with linear optical-to-electrical connection at an optical network unit (ONU) may be used.

It will be readily apparent to persons of ordinary skill in the art that connecting a DSL modem and/or data analyzer to a customer involves, for example, communicatively connecting the DSL modem and/or data analyzer operated by a communications company to a telephone line (i.e., a subscriber line) that is communicatively connected to a second DSL modem and/or data analyzer located at and/or in a customer premises (e.g., a home and/or place of business owned, leased or otherwise occupied and/or utilized by the customer). The second DSL modem and/or data analyzer may be further communicatively connected to another communication and/or computing device (e.g., a personal computer) that the customer operates to access a service (e.g., Internet access) via the first and second DSL modems and/or data analyzer, the telephone line and the communications company.

Figure 7:
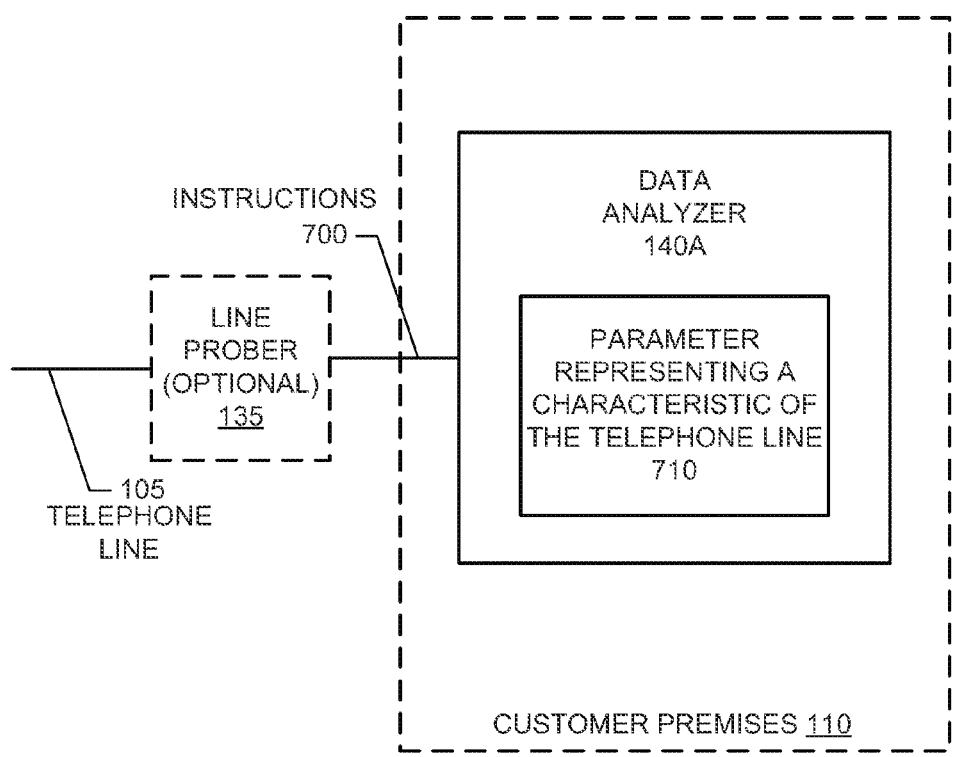
FIG. 7 is a block diagram of a data analyzer according to one exemplary embodiment.

According to an exemplary embodiment as shown in FIG. 1 and especially in FIG. 7, a data analyzer 140, 140A located at a customer premises 110, causes the transmission of a probing signal (i.e. via instructions 700) into at least one telephone line 105. The data analyzer 140 computes a parameter that represents a characteristic of the at least one telephone line 710 based upon at least a measured reflection of the probing signal.

FIG. 1 illustrates an example DSL system that measures, computes and/or otherwise determines any number and/or any of a variety of parameter(s) that characterize, describe and/or indicate the state of ordinary twisted-pair copper telephone line(s) that are being used and/or may be attempted to be used to provide DSL service(s) to the customer(s). Four such telephone lines are shown in FIG. 1 with reference numerals 105A, 105B, 105C and 105D. In the example system of FIG. 1, the characterizing parameter(s) are measured, computed and/or otherwise determined based upon one or more signals optionally transmitted from the customer premises 110 and/or one or more signals received and/or measured at the customer premises 110. However, a DSLAM 110 may or may not terminate the telephone lines 105A-D at other ends of the connections. Example characterizing parameters include, but are not limited to, loop length, segment length(s), cable gauge(s), bridged-tap presence, bridged-tap location (s), bridged-tap length(s), bridged-tap gauge(s), open faults, short faults, cross faults, bad splice/connection, noise, excessive noise, data rate, signal-to-noise ratio(s), loop impedance, loop make-up, and/or loop attenuation. Alternatively or additionally, raw data collected by receiving and/or measuring signal(s) from a telephone line 105A-D may be instead forwarded to a geographically separate device to compute these or other parameters. Such raw data may include digitized responses to pulse(s) launched by a line-probing device 135A-D into the telephone line 105A-D, measurements of noise with no signals launched, and/or direct impedance measurements. As discussed below, the determination and/or computation of the characterizing parameter(s) based on the signals received and/or measured at the customer premises 110 may be implemented at the customer premises 110 and/or at a geographically separate device.

To provide DSL services to the customer(s) via the example telephone lines 105A-D, the example system of FIG. 1 includes any variety of DSLAM 110. The example DSLAM 110 of FIG. 1 implements, among other things, any of a variety and/or number of DSL modems (not shown). The DSLAM 110 may be located in a central office (CO) and/or a remote terminal (RT). Persons of ordinary skill in the art will appreciate that, like other components described in the examples described herein, the DSLAM 110 need not be present.

To monitor, measure and/or record current and/or historical DSL performance characteristics for DSL communications occurring between the example DSLAM 110 and a plurality of subscriber DSL modems (two of which are shown with reference numerals 115A and 115B), the example DSL system of FIG. 1 includes a DSL maintenance device 120 and a database 125. A DSL maintenance device 120 may be part of, implemented by and/or performed by any or all of the following: a Spectrum Management Center (SMC), a Dynamic Spectrum Management Center (DSM Center), a DSL Optimizer (DSLO), a DSL Management center, a DSL Operations Center, an Operations Support System (OSS), an Element Management System (EMS), a Network Management System (NMS), other transmission or management network elements, and/or the example DSLAM 110. As described below, the DSL example maintenance device 120 may request, receive, compute and/or otherwise obtain any number and/or any of a variety of parameters that characterize the telephone line(s) and that are used to provide and/or may potentially be used to provide DSL services (e.g., the example telephone lines 105A-D). In the illustrated example, the telephone-line-characterizing parameter(s) and/or the performance characteristic(s) are stored in the example database 125 using any of a variety of data structure(s), data table(s), data array(s), etc. The example database 125 is stored in a machine accessible file and/or in any of a variety of memory 130. Using any of a variety of method(s), technique(s) and/or algorithm(s), a service provider may use the telephone-line-characterizing parameter(s) and/or the performance characteristic(s) stored in the database 125, for example, to offer, sell and/or provision new DSL services, and/or to maintain, monitor and/or diagnose existing DSL services.

To measure signals from which the telephone-line-characterizing parameter(s) may be determined, the example system of FIG. 1 includes line probers at customer premises 110. Three example line probers 135A, 135B, 135C, and 135D are shown in FIG. 1. The example line probers 135A-D of FIG. 1 transmit any of a variety of line probing signals and/or receive and/or measure any of a variety of reflected line probing signals, crosstalk line probing signals and/or noise signals. Example probing signals include pulse and/or step time domain reflectometry (TDR) signals, spread spectrum signals, nominal modem transmission signals (e.g., a multi-carrier signal of an ADSL modem), chirp signals, impulse trains, single impulse, etc. To measure noise conditions, a line probing signal may be a zero-voltage, quiet, null and/or all zeros signal such that, effectively, no signal is transmitted into a telephone line being tested and/or characterized. An example implementation of the example line probers 135A-D is discussed below in connection with FIG. 2.

To determine and/or compute the telephone-line-characterizing parameter(s) from signals received and/or measured by the example line probers 135A-D, the example system of FIG. 1 includes data analyzers. Four example data analyzers 140A, 140B, 140C and 140D are shown in FIG. 1. Using any of a variety of method(s), technique(s) and/or algorithm(s), the example data analyzers 135A-D estimate, determine and/or compute the characterizing parameter(s) from the received and/or measured signals. For example, with knowledge of what probing signal was transmitted, and given a received and/or measured reflected signal, a data analyzer can, for example, compute an echo path response, detect the presence of a bridged tap, characterize a detected bridged tap, estimate a loop attenuation, etc. In some circumstances, the measured reflected signals at the customer end of a telephone line will include a much greater level of detail about a customer premises environment and/or the telephone line than would be available from reflected signals at the other (e.g., CO or RT) end. Therefore, the illustrated example seeks to obtain this enhanced level of detail by performing one or more line test(s) from the customer premises 110.

The example data analyzers 140A-D of FIG. 1 may be implemented by any of a variety of computing devices such as, for example, a) a subscriber's PC, b) stand alone data analyzer, c) combined with a line prober, and/or d) a DSL modem or e) a subscriber's set-top box. For example, a PC implementing a data analyzer 140A may be connected to an Internet network and/or service 145 via, for example, the DSL modem 115A. In such an example, the PC/data analyzer 140A is used to receive and/or utilize, for example, Internet, audio, video, email, messaging, television, and/or data services via the subscriber's DSL service. In such an example, the PC 140A is connected to the Internet 145 via the DSL modem 115A, the telephone line 105A and the DSLAM 110. Accordion to one embodiment, the DSL modem 115A may be communicatively coupled to the example PC 140A and/or be implemented by and/or within the example PC 140A.

The example data analyzers 140A-D of FIG. 1 may execute machine accessible instructions to determine and/or compute the telephone-line-characterizing parameter(s) from signal(s) received and/or measured by the corresponding example line probers 135A-D. In the example system of FIG. 1, such machine accessible instructions may be (a) loaded into a data analyzer via a compact disc (CD) or other non-volatile storage (e.g., a digital versatile disc (DVD)) mailed and/or provided by, for example, a service provider; (b) downloaded to the data analyzer 140A, 140B, 140C and/or 140D from an Internet site (e.g., a download server 155 that provides machine accessible instructions provided by the DSL maintenance device 120), and/or (c) loaded into the data analyzer by, for example, the DSL maintenance device 120. Any of a variety of network protocols such as, for example, hypertext transfer protocol (HTTP), file transfer protocol (FTP), and/or email protocols (e.g. SMTP) may be used to transfer the machine accessible instructions to the data analyzer 140A, 140B. 140C and/or 140D.

The characterizing parameter(s) determined and/or computed by the example data analyzers 140A-D are stored by and/or within the data analyzers 140A-D using any of a variety of data structure(s), machine accessible file(s), and/or memory(ies). The example data analyzers 140A-D of FIG. 1 provide the determined and/or computed characterizing parameter(s) to the DSL maintenance device 120 via any of a variety of method(s), network(s) and/or protocol(s). For example, if there is a DSL connection available and/or operable between the DSL modem 115A and the DSLAM 110, the example data analyzer 140A-D can provide the characterizing parameter(s) via the DSL service using, for example, the exchange protocol defined in the ITU G.994.1 (a.k.a. G.hs) standard. Additionally or alternatively, the characterizing parameter(s) may be sent and/or provided to the DSL maintenance device 120 via the Internet 145 and/or a PSTN 150 using, for example, a dial-up and/or voice-band modem communicatively coupled to, and/or implemented by and/or within the data analyzer 140A-D. Such a dial-up or voice-band modem could operate over the voice band on the same loop as the DSL service, or it could operate over a separate loop supporting POTS service. A data analyzer may, additionally or alternatively, provide the characterizing parameter(s) to the DSL maintenance device 120 via any of a variety of intermediary service(s) such as, for example, an Auto-Configuration Server (ACS) as defined in the DSL Forum document TR-069. In the example of FIG. 1, if a data analyzer 140A, 140B, 140C and/or 140D is not currently communicatively coupled and/or couple-able to the example DSL maintenance device 120, the characterizing parameter(s) may be sent and/or provided via any of a variety of additional and/or alternative methods such as, for example, storing the characterizing parameter(s) on a CD or other non-volatile storage medium (e.g., a DVD) that can be sent and/or delivered to a service provider and then loaded into the DSL maintenance device 120. Additionally or alternatively, a data analyzer 140A, 140B, 140C and/or 140D can display the parameter(s) in, for example, the form of a condensed ASCH code using any of a variety of graphical user interfaces (GUIs) displayed for and/or presented to a person 155. The example person 155 can in turn provide the parameter(s) to a technician and/or customer service representative 160 who in turn loads the provided parameter(s) into the DSL maintenance device 120. The person 155 may be, for example, a subscriber or technician.

As illustrated in FIG. 1, the line probers 135A-D and the data analyzers 140A-D may be implemented using any of a variety of combinations. For example, the example line prober 135A is implemented by and/or within any of a variety of DSL modem(s) 115A, the example line prober 135B is implemented as any of a variety of stand-alone devices such as, for example, a tester, the example line prober 135C is implemented by and/or within the example data analyzer 140C. Also, a single prober could be implemented by and/or within multiple DSL modems present at the customer premises 110. Persons of ordinary skill in the art will readily appreciate that there are a multitude of other ways of implementing line probers and/or data analyzers. For example, a line prober may be implemented by any of variety of residential gateways or STBs.

The example line probers 135A-D may be communicatively coupled to their respective data analyzer 140A-D via any of a variety of communication buses, backplanes, wired and/or wireless signals and/or technologies such as, a universal serial bus (USB), and/or a wired and/or wireless connection in accordance with the Institute of Electrical and Electronics Engineers (IEEE) 802.3x and/or 802.1x standards. Additionally, a DSL modem may be implemented by and/or within a data analyzer 140A, 140B, 140C and/or 140D using, for example, a peripheral component interface (PCI) card.

In the example system of FIG. 1, determination and/or computation of the parameter(s) that characterize a telephone line may be initiated, requested and/or provided in any of a variety of ways. For example, the example DSL maintenance device 120 may send a request and/or command to a data analyzer 140A, 140B, 140C and/or 140D that in turn requests the transmission of probing signals to a corresponding line prober 135A, 135B, 135C and/or 135D and/or requests reception and/or measurement of signals from the line prober 135A, 135B, 135C and/or 135D. The data analyzer 140A, 140B, 140C and/or 140D may additionally compute and/or determine the characterizing parameter(s) from the received and/or measured signals obtained via the respective line prober 135A, 135B, 135C and/or 135D, and then return the same to the DSL maintenance device 120 as discussed above. Additionally or alternatively, a DSL subscriber, technician, installer, etc. may initiate the process of transmitting probing signals, signal measurement, and/or characterizing parameter computation and/or determination via any of a variety of GUIs provided and/or displayed by a data analyzer 140A, 140B, 140C and/or 140D. Finally, the transmission of probing signals may be initiated by a DSL modem operating in loop diagnostic mode. The data analyzer itself may make regular or periodic attempts to identify itself to a service provider DSL 140A, 140B, 140C and/or 140D maintenance device of any service provider through any of the above-mentioned electronic communication paths. Thus, its release of data need not necessarily be prompted by a service provider.

In the illustrated example of FIG. 1, example line probers 135A, 135B, 135C and/or 135D implemented by and/or within a DSL modem, residential gateway, etc. have access to alternating current (AC) and/or battery power, even if the DSL modem or residential gateway is in a low power state and/or is turned off. This allows a communicatively coupled data analyzer 140A, 140B, 140C and/or 140D to request line testing, probing and/or signal measuring independent of the state of the DSL modem or residential gateway. Thus, line testing, probing and/or characterizing can be performed by technicians, maintenance personal and/or customer service representatives even if the DSL modem or residential gateway is turned off. In such circumstances, the sending of request(s) to the data analyzer C occurs via another existing and/or available connection between the data analyzer 140A, 140B, 140C and/or 140D and the Internet 145 and/or the PSTN 150, and/or via a user operating, for example, a GUI displayed and/or provided by the data analyzer 140A, 140B, 140C and/or 140D.

While in the example of FIG. 1, the example line probers 135A-D and the example data analyzers 140A-D are located at customer premises 110, persons of ordinary skill in the art will readily appreciate that, additionally or alternatively, line probers 135A, 135B, 135C and/or 135D and/or data analyzers 140A, 140B, 140C and/or 140D may be implemented at a CO or RT. For example, a data analyzer 140A, 140B, 140C and/or 140D could be implemented by and/or within the example DSL maintenance device 120. In such an example, the line prober (e.g., line prober 135A, 135B, 135C and/or 135D) provides received and/or measured probing and/or noise signals to the data analyzer remotely located in the DSL maintenance device 120. Further, while FIG. 1 illustrates one data analyzer 140A-D for each line prober 135A-D, persons of ordinary skill in the art will readily appreciate that a data analyzer that is, for example, located at a CO may determine and/or compute characterizing parameter(s) for more than one telephone line using received and/or measured signals from more than one line prober 135A-D located at customer premises 110. Further still, one or more line probers may be implemented by, within and/or in conjunction with a DSLAM to provide line testing, probing and/or characterizing from the service provider's end of a telephone line.

In the illustrated example, the example DSL maintenance device 120 can also use a set of line probers 135A-D to measure and/or characterize near-end and/or far-end crosstalk. For example, a first line prober at a first customer premises 110 (e.g., the example line prober 135A-D) can be configured to transmit a probing signal into a first telephone line (e.g., the telephone line 105A) while, at substantially the same time, a second line prober at a second customer premises 110 (e.g., the example line prober 135B) suspends transmission of the line probing signal, transmits a "quiet" signal, or no signal into a second telephone line (e.g., the telephone line 105B). A signal then received and measured by the second line prober 135B can be used to characterize so called "near-end crosstalk" from the first telephone line 105A associated with the first line prober 135A into the second telephone line 105B associated with the second line prober 135B. If the second line prober 135B is instead located at the CO end 100 of the second telephone line 105B, then the signal received and measured by the second line prober 135B can be used to characterize so called "far-end crosstalk" from the first telephone line 105A into the second telephone line 105B. The second line prober 135B of the illustrated example need not send signals into the line to measure signals from the line. Instead, the illustrated example second line prober 135B may collect and save samples from the line 105B at regular and/or irregular intervals to assess noise at the customer premises 110 and/or CO 100. Such samples can be stored in the second line prober 135B and then be provided when the second line prober 135B is interrogated by the data analyzer 140B, forwarded at scheduled times, forwarded upon the occurrence of predetermined events (e.g. storage of a predetermined amount of data), and/or at other periodic and/or aperiodic times. According to another embodiment, the data analyzer 140 instructs a single line prober 135 to transmit a probing signal into a first and then at second telephone line 105. A switch controlled by the data analyzer can switch an output of the line prober 135 between the first and second telephone line 105. Thus, the data analyzer 140 selects between the first and the second telephone line 105 for the line prober 135 to transmit the respective probing signal and to measure the respective reflection of the probing signal. According to this example, the data analyzer 140 is operative to instruct the line prober 135 to transmit a probing signal into a first telephone line, and to compute a first parameter that represents a characteristic of the first telephone line 710 based upon a measured reflection of the probing signal from the first telephone line. Similarly, the data analyzer 140 is operative to instruct the line prober 135 to transmit a probing signal into a second telephone line, and to compute a second parameter that represents a characteristic of the second telephone line 710 based upon a measured reflection of the probing signal from the second telephone line.

Figure 2:
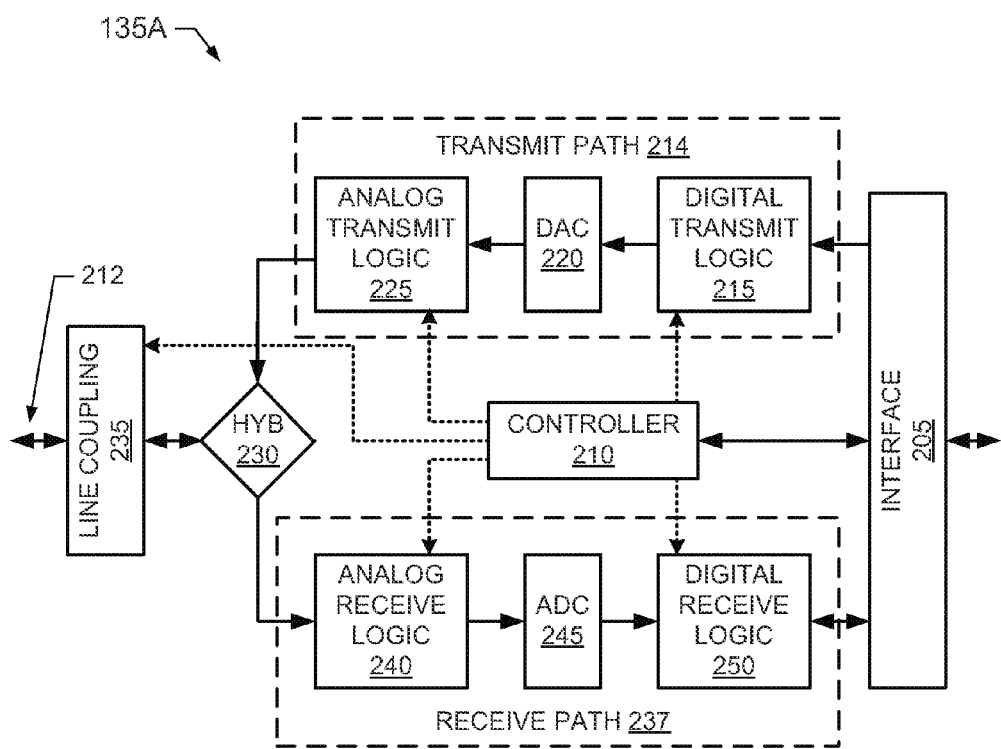
FIG. 2 illustrates an example line prober of FIG. 1 constructed in accordance with one embodiment.

FIG. 2 illustrates an example manner of implementing the example line prober 135A of FIG. 1. Persons of ordinary skill in the art will readily appreciate that the example line probers 135B, 135C and 135D may be similarly implemented. To communicate with the example data analyzer 140A (FIG. 1), the example line prober 135A of FIG. 2 includes any of a variety of interfaces 205 such as, for example, a USB interface or a wired and/or wireless Ethernet interface. Among other things, the example interface 205 of FIG. 2 receives commands from the data analyzer 140A and provides signal receiving and/or measurement data to the data analyzer 140A. The commands and/or measurement data may be received, acknowledged and/or transmitted using any of a variety of format(s), communication protocol(s) and/or technique(s).

To control the example line prober 135A of FIG. 2, the line prober 135A includes a controller 210. The example controller 210 may be any of a variety of processors such as, for example, a digital signal processor (DSP), a general purpose processor and/or microcontroller, a reduced instruction set computing (RISC) processor, a specialized processor, etc. As illustrated in FIG. 2, the example controller 210 also provides configuration and/or control information to a transmit path 214, a line coupling 235 and/or a receive path 237. An example implementation of the example controller 210 of FIG. 2 is discussed below in connection with the example machine accessible instructions of FIG. 5.

To form and/or transmit a line probing signal suitable for transmission into a telephone line 212, the example line prober 135A of FIG. 2 includes the transmit path 214. If the line prober 135A is implemented by and/or within a DSL modem and/or residential gateway, the example transmit path 214 may be implemented by and/or as part of, for example, the transmit path of the DSL modem and/or residential gateway. The example transmit path 212 of FIG. 2 includes digital transmit logic 215, a digital-to-analog converter (DAC) 220 and analog transmit logic 225. As noted above, transmission of such a signal is not prerequisite to all measurements (e.g., it is not prerequisite to measuring line noise signals). Instead, some measurements may be performed with or without transmission of probing signals. Thus, although the line probers 135A-D are referred to herein as a "prober," it is emphasized that the prober may be a passive device that simply measures samples from a telephone line, an active device that transmits probing signals into the telephone line, and/or a combined passive and active device that performs any or all of these techniques.

The example digital transmit logic 215 of FIG. 2 implements a variety of digital processing functions to generate digital transmit signals (e.g., a line probing signal) and/or to perform digital signal processing such as, for example, filter, up-sampling, etc. In addition to the generation of DSL transmit signals, the example digital transmit logic 215 may generate any of a variety of alternative or additional digital line-probing signals such as, for example, pulse and/or step TDR signals, spread spectrum signals, nominal modem transmission signals, chirp signals, an impulse, an impulse train, or no signal so that quiet-line noise (QLN) can be measured etc. The example digital transmit logic 215 may generate the probing signal independently and/or based upon any of a variety of parameter(s) and/or representative signal(s) provided by the data analyzer 140A via the example interface 205. For example, the data analyzer 140A may specify the amplitude and period for an impulse train probing signal.

In one embodiment of the digital transmit logic 215, a digital signal may be generated using a sequence of operations that include at least one of the following steps: generation of a signal in the frequency domain corresponding to a multitude of sub-carriers, scaling the signal components in the frequency domain such that the transmitted power of different sub-carriers can be appropriately selected, performing an IFFT operation to convert the frequency-domain signal to the time domain, adding a cyclic extension to the output of the IFFT operation, applying a windowing operation to the output of the IFFT operation to improve spectral containment, converting the parallel signal representation of the previous output into a serial representation, and performing one or more stages of upsampling and filtering operations. Parts or all of the functionality of the digital transmit logic 215 can alternatively be assumed by the data analyzer 140A-D.

To convert a digital transmit signal generated by the digital transmit logic 215 into an analog waveform and/or signal, the example line prober 135A of FIG. 2 includes the DAC 220. In one embodiment of the DAC 220, the conversion rate of the digital signal into an analog signal is chosen to be a multiple of 4.3125 kHz, with the preferred values being 2.208 MHz, 4.416 MHz, 8.832 MHz, 17.664 MHz, 35.328 MHz, 70.656 MHz, and 141.312 MHz, which correspond to the typical conversion rates found in DSL systems using DMT technology. To provide any additional and/or necessary analog processing such as, for example, gain, filtering, voltage-to-current conversion, etc. prior to transmission of the analog waveform and/or signal into the telephone line 212, the example transmit path 214 of FIG. 2 includes the analog transmit logic 225.

To couple the analog transmit signal generated by the analog transmit logic 225 onto the two-wire telephone line 212, the example line prober 135A of FIG. 2 includes a hybrid 230. Using any of a variety of technique(s), logic, circuit(s) and/or component(s), the example hybrid 230 forms a suitable four-wire to two-wire conversion to allow the line prober 135A to simultaneously transmit and receive signals via the telephone line 212.

To couple the two-wire signal formed by the example hybrid 230 to the telephone line 212, the example line prober 135A of FIG. 2 includes any of a variety of line couplings 235. Among other things, the example line coupling 235 of FIG. 2 presents and/or provides an appropriate termination that suitably mimics the impedance of the telephone line 212 thereby enabling efficient transmission and/or reception of signals into and/or from the telephone line 212. The example line coupling 235 of FIG. 2 also includes any of a variety of logic, switch(es) or component(s) that allow the example line coupling 235 to inject and/or extract signals in an intrusive manner or in a monitoring manner. In an example monitoring mode, the example receive path 237 may be able to receive signals from the telephone line 212 simultaneously with another circuit in a DSL modem while the DSL modem is operational (i.e., monitor the receive signal). In an intrusive mode, the transmit path 214 has substantially the sole ability to transmit a signal into the telephone line 212 and, thus, intrusively disconnects any associated DSL modem from the telephone line 212.

To allow the example line prober 135A and/or a DSL modem that implements the line prober 135A to present a desired termination impedance towards the telephone line 212, the example line coupling 235 of FIG. 2 may, additionally or alternatively, include a termination-impedance circuit. The termination-impedance circuit may also be implemented separately from the example line coupling 235. An example termination-impedance circuit is discussed below in connection with FIG. 4 and is controllable by, for example, the example controller 210.

In some embodiments, a single line prober 135A-D may be configured to connect to more than one telephone line 105A, in order to facilitate testing for choosing one or more best telephone lines among a multitude of available telephone fines at the customer premises 110 or in order to collect information from multiple telephone lines that may be used to provide a bonded DSL service. In one embodiment, a single line prober 135A-D may contain logic to select the one telephone line to test by coupling the Line Coupling 235 to one of the pairs connected to an RJ-11 or a similar connector with more than 2 pins. The line prober 135A-D may receive instruction about which pair to test through the Data Analyzer 140A-D, which may originate from the DSL Maintenance Device 120. For this purpose, a register may be maintained at the line prober 135A-D and the data analyzer 140 to identify a proper telephone pair to be tested or that has already been tested. The register may hold a unique identification tag for a telephone pair, and the contents of the register may be downloaded from the DSL Maintenance Device 120.

To receive and/or measure signals present on the telephone line 212, the example line prober 135A of FIG. 2 includes the receive path 237. If the line prober 135A is implemented by and/or within a DSL modem and/or residential gateway, the example receive path 237 may be implemented by, for example, the receive path of the DSL modem and/or residential gateway. Similarly, data analyzer 140C may be integrated with line prober 135C, or alternatively may be implemented in a computer as data analyzer 140A, set top box as data analyzer 140D or as a DSL modem 115B. The example receive path 237 of FIG. 2 includes analog receive logic 240, an analog-to-digital converter (ADC) 245 and digital receive logic 250.

To convert the analog signal received via the example hybrid 230 into an analog waveform and/or signal suitable for conversion to a digital signal, the example receive path 237 of FIG. 2 includes the analog receive logic 240. The analog receive logic 240 may implement, for example, gain, current-to-voltage conversion, filtering, etc. To convert the analog signal provided by the analog receive logic 240 to a digital representation of the analog signal, the example receive path 237 of FIG. 2 includes the ADC 245. In one embodiment of the ADC 245, the sampling rate of the analog signal is chosen to be a multiple of 4.3125 kHz, with the preferred values being 2.208 MHz, 4.416 MHz, 8.832 MHz, 17.664 MHz, 35.328 MHz, 70.656 MHz, and 141.312 MHz, which correspond to the typical sampling rates found in DSL systems using DMT technology.

To receive and/or measure signals suitable for processing by the example data analyzer 140A, the example receive path 237 includes the digital receive logic 250. Among other things, the example digital receive logic 250 may implement filtering, down-sampling, etc. The example digital receive logic 250 may, additionally or alternatively, implement digital processing to perform averaging of a plurality of received signals to, for example, reduce a noise variance associated with the received signals, compute an echo response based upon a transmitted signal and a received signal. For example, if the example transmit path 215 is configured to transmit an impulse train, the digital receive logic 250 could add together a plurality of received signals where the time duration of each received signals corresponds to the periodicity of the impulse train. Additionally or alternatively, such averaging may be performed in the data analyzer 140A.

In one embodiment of the digital receive logic 250, the receiver processing steps may include at least one of the following: one or more stages of filtering and down-sampling, a conversion of the serial signal representation into a parallel signal representation (block formation), a receiver windowing operation, the removal of a cyclic extension from the received block, an FFT operation to convert the time-domain signal to the frequency domain, and/or scaling the output of the FFT operation to equalize the signal on each sub-carrier. Parts or all of the functionality of the digital receive logic 250 can alternatively be assumed by the data analyzer 140A-D.

It will be readily appreciated by persons of ordinary skill in the art that for line testing and/or characterization purposes the example receive path 237 of FIG. 2 may be used to measure and/or receive any of a variety of signal(s). Example signals include a reflected version of a transmitted signal, a far-end and/or near-end crosstalk signal caused by a signal transmitted on a neighboring telephone line, a noise signal, etc. The example receive path 237 may also be used to receive, measure and/or process any type of signal(s) such as DSL modem signals, pulse and/or step TDR signals, impulse trains, spread spectrum signals, chirp signals, etc, or to measure noise in the absence of such signals.

In one embodiment of the present invention, the data analyzer 140A-D generates the digital signal to be provided to the digital transmit logic 215 via the interface 205. The digital signal may be generated as a frequency-domain signal using a pseudo-random-number generator. The output of pseudo-random-number generator is used to form constellation points for a multitude of subcarriers using Quadrature Amplitude Modulation (QAM). In a first embodiment, the output of the pseudo-random number generator is used only for the duration of a single block, and consequently, this single block is repeated a certain number of times. In a second embodiment, the pseudo-random number generator is used for the duration of multiple blocks. To those skilled in the art, the generated signal of the first embodiment is known as REVERB, while the generated signal of the second embodiment is known as MEDLEY. In a third embodiment, no pseudo-random number generator is used, and the digital signal to be input to the digital transmit logic 215 is formed by constructing the desirable signal (e.g. pulse, step, impulse, impulse train, chirp, spread-spectrum signals) based on signal characteristics (e.g. duration, period, amplitude) provided by the DSL Maintenance Device 120. In yet another embodiment, the digital signal is directly provided by the DSL Maintenance Device 120.

While an example line prober 135A has been illustrated in FIG. 2, the elements, modules, logic, memory and/or devices illustrated in FIG. 2 may be combined, re-arranged, eliminated and/or implemented in any of a variety of ways. Further, the example interface 205, the example controller 210, the example transmit path 214, the example digital transmit logic 215, the DAC 220, the analog transmit logic 225, the hybrid 230, the line coupling 235, the example receive path 237, the analog receive logic 240, the ADC 245, the example digital receive logic 250 and/or, more generally, the example line prober 135A of FIG. 2 may be implemented by hardware, software, firmware and/or any combination of hardware, software and/or firmware. For example, the example interface 205, the example controller 210, the example digital transmit logic 215 and/or the example digital receive logic 250 may be implemented via machine accessible instructions executed by any of a variety of processors such as, for example, a digital signal processor (DSPs), a general purpose processor and/or microcontroller, a specialized processor, a RISC processor, etc. Moreover, a line prober may include additional elements, modules, logic, memory and/or devices than those illustrated in FIG. 2 and/or may include more than one of any or all of the illustrated elements, modules and/or devices.

Figure 3:
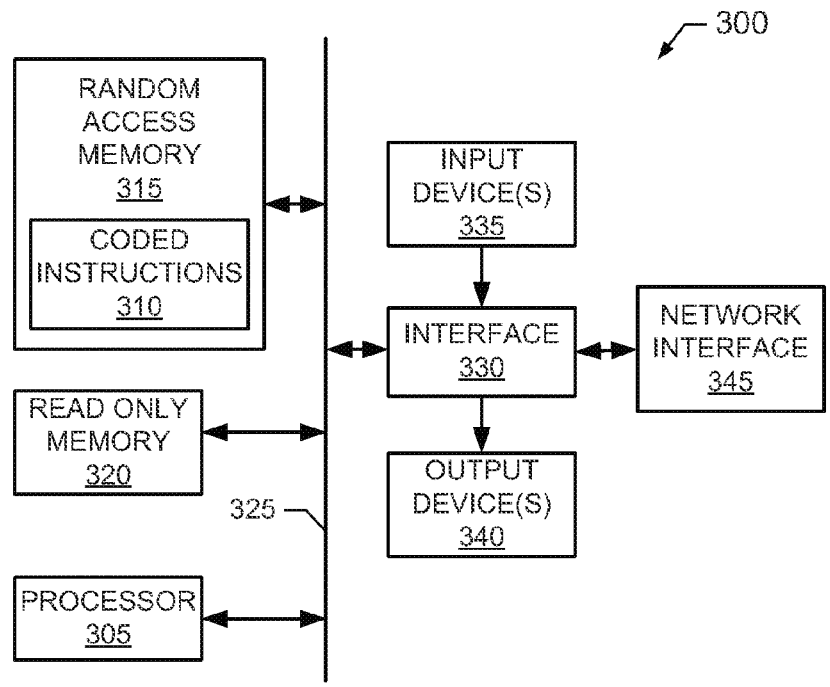
FIG. 3 is a schematic illustration of an example processor platform that may be used and/or programmed to implement the example data analyzer of FIG. 1 and/or to execute the example machine-accessible instructions illustrated in FIGS. 5 and/or 6 to implement the example line probers and/or the example data analyzer of FIG. 1.

FIG. 3 is a schematic diagram of an example processor platform 300 that may be used and/or programmed to implement any of example line probers 135A-D of FIGS. 1 and/or 2, and/or any of the example data analyzers 140A-D of FIG. 1. For example, the processor platform 300 can be implemented by one or more general-purpose processors, cores, microcontrollers, etc. Further, the example processor platform 300 may be included in a DSL modem, a set-top box, a computer, personal computer, a residential gateway, bridge router or any suitable device.

The processor platform 300 of the example of FIG. 3 includes a programmable processor 305. The processor 305 executes coded instructions 310 present in main memory of the processor 305 (e.g., within a random access memory (RAM) 315). The processor 305 may be any type of processing unit, such as a DSP, a RISC processor, and/or a general purpose and/or customized processor from the INTEL®, AMD®, SUN®, IBM® families of cores, processors, dual/quad processors and/or microcontrollers. The processor 305 may execute, among other things, the example machine accessible instructions of FIGS. 5 and/or 6 to implement any of example line probers 135A-D of FIGS. 1 and/or 2, and/or any of the example data analyzers 140A-D of FIG. 1.

The processor 305 is in communication with the main memory (including a read only memory (ROM) 320 and the RAM 315) via a bus 325. The RAM 315 may be implemented by dynamic random access memory (DRAM), Synchronous DRAM (SDRAM), and/or any other type of RAM device, and ROM may be implemented by flash memory and/or any other desired type of memory device. Access to the memory 315 and 320 is typically controlled by a memory controller (not shown). The RAM 315 may be used to store, for example, the probing signal parameters, received signals, measured signals, or telephone line characterization parameter(s).

The processor platform 300 also includes an interface circuit 330. The interface circuit 330 may be implemented by any type of interface standard, such as an external memory interface, serial port, general purpose input/output, etc.

One or more input devices 335 and one or more output devices 340 are connected to the interface circuit 330. The input devices 335 may be used, for example, to implement the example interface 205 of FIG. 2. The output devices 340 may be used, for example, to display and/or provide a GUI. The illustrated example of FIG. 3 also includes a network interface 345 that may be used to communicatively couple a line prober with a data analyzer, and to couple a data analyzer with the Internet 145 (FIG. 1). Other example devices that may be connected to the interface 330 include a voice-band modem or a non-volatile removable storage device such as a CD drive or memory card interface.

In one embodiment, the network interface 345 couples the data analyzer 140A-D and the DSL Maintenance Device 120 through the Internet using the Internet Protocol (IP) and a transport protocol such as the Transmission Control Protocol (TCP) or the User Datagram Protocol (UDP). A packet for testing at customer premises 110 may be transported as the payload of a TCP packet or of a UDP datagram. A packet for testing at customer premises 110 may be a control packet (transported from a DSL Maintenance Device 120 to a data analyzer 140A-D), or it may be a data packet (transported from a data analyzer 140A-D to a DSL Maintenance Device 120). A packet for testing at customer premises 100 may consist of the following basic fields: registration information, payload and CRC field. The registration field may include identification information about the DSL Maintenance Device 120, the Line Prober 135A-D, the Data Analyzer 140A-D, and the telephone line 105A-D. Such identification information may refer to hardware, firmware and/or software versions, equipment identification, network addresses, and such. The CRC field may be one or more bytes used for checking data integrity. The payload may depend on whether this is a control or a data packet.

In one embodiment, there may be multiple types of control packets, such as a SET packet, an INIT packet, and a REQUEST packet. A SET packet may be used by the DSL Maintenance Center 120 to configure the Data Analyzer 140A-D and or the Line Prober 135A-C for performing the testing at the customer premises. A SET packet may consist of multiple fields, where each field may specify one or more of the following parameters: Test signal type (e.g. REVERB, MEDLEY, QUIET, pulse, step, impulse, impulse train), sampling rate for ADC and/or DAC, signal parameters (e.g. pseudo-random generator seed, taps, pulse width, signal amplitude and/or PSD, impulse period, signal in raw form, differential/common mode), line prober parameters (e.g. impedance value, transmit path settings, receive path settings). An INIT packet may be used by the DSL Maintenance Center 120 to initiate a test at the customer premises. An INIT packet may consist of multiple fields, where each field may specify one or more of the following parameters: Time of test (e.g. at once, scheduled for some future time, periodically), type of measurement (e.g. PSD measurement, signal capture, averaging characteristics). A REQUEST packet may be used by the DSL Maintenance Center 120 to obtain the results of testing at the customer premises from the Data Analyzer 140A-D. A REQUEST packet may consist of multiple fields, where each field may specify one or more of the following parameters: Request for secondary processing by the Data Analyzer 140A-D (e.g. compute probability of bad splice), requested parameters (e.g. raw received signal, loop length, segment length(s), cable gauge(s), bridged-tap presence, bridged-tap location(s), bridged-tap length(s), bridged-tap gauge(s), open faults, short faults, cross faults, bad splice/connection, noise, excessive noise, data rate, signal-to-noise ratio(s), loop impedance, loop make-up, and/or loop attenuation).

In one embodiment, there may be multiple types of data packets, such as a SET-ACK packet, a INIT-ACK packet, and a REQUEST-RESPONSE packet. The SET-ACK packet may be sent by a Data Analyzer 140A-D to a DSL Maintenance Center 120 to confirm the settings provided by the DSL Maintenance Center 120 through a SET control packet. The SET-ACK packet may provide status codes for one or more of the requested settings. The INIT-ACK packet may be sent by a Data Analyzer 140A-D to a DSL Maintenance Center 120 to confirm that the test instructed by a DSL Maintenance Center 120 through an INIT control packet was successfully concluded. The INIT-ACK packet may include a status code to indicate whether the test was performed successfully, whether problems were encountered, or whether the test failed (e.g. a DSL line was found to be active). The REQUEST-RESPONSE packet may consist of the parameters requested by a DSL Maintenance Center 120, and may indicate those parameters that could not be accurately measured or derived by a Data Analyzer 140A-D.

In another embodiment, the network interface 345 couples the data analyzer 140A-D and the DSL Maintenance Device 120 through the Internet using a protocol stack consisting of the following layers: TCP/IP, Secure Socket Layer (SSL)/Transport Layer Security (TLS), Hyper-Text Transport Protocol (HTTP), Simple Object Access Protocol (SOAP), and Remote Procedure Call (RPC) methods. This protocol stack is similar to the one described in DSL Forum Technical Report TR-069, May 2004. In this embodiment, the Data Analyzer 140A-D maintains a list of readable and/or writable parameters, which are accessible via RPC methods that may be called by a DSL Maintenance Device 120 and/or a Data Analyzer 140A-D. Each method call is followed by a response by the corresponding called entity. Methods called by the DSL Maintenance Center 120 may be used to set the value of one or more parameters, get the value of one or more parameters, set the attribute of one or more parameters, add an object, delete an object, download a file to the Data Analyzer 140A-D, upload a file from a Data Analyzer 140A-D, and/or reset the Line Prober 135A-D. Methods called by the Data Analyzer 140A-D may be used to inform the DSL Maintenance Center 120 of events and/or parameter changes (e.g. threshold exceeded), and/or to indicate the completion of a file transfer. The file download from a DSL Maintenance Device 120 to a Data Analyzer 140A-D may facilitate a software upgrade for the Data Analyzer 140A-D and/or the Line Prober 135A-D.

Figure 4:
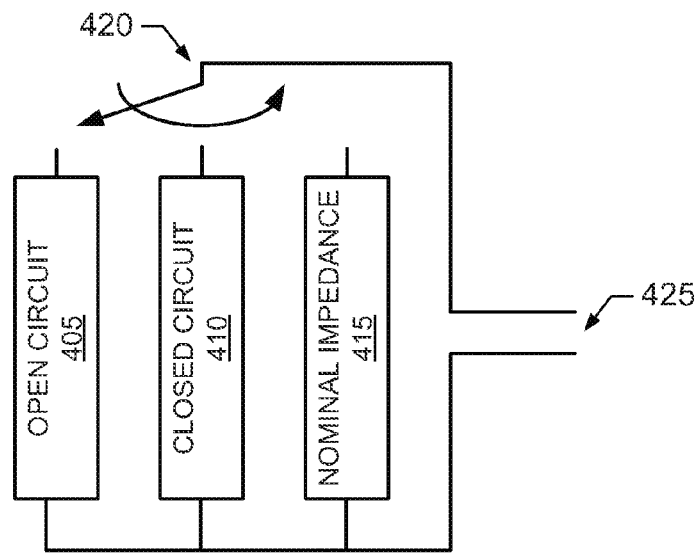
FIG. 4 is a schematic illustration of an example termination impedance circuit for a digital subscriber line (DSL) modem.

FIG. 4 is a schematic illustration of a switch and/or an example termination impedance circuit. The example termination impedance circuit of FIG. 4 may be used in conjunction with any of a variety of communication device to allow the communication device to present a plurality of termination impedances to a communication medium. For instance, the example termination circuit may be implemented by, within and/or as a part of a DSL modem 115A-B, data analyzer 140A-D, router, computer or other suitable device to allow the DSL modem 115A-B to implement a plurality of termination impedances that facilitate telephone-line characterization using, for example, single-ended line testing methods, techniques and/or algorithms. Such line testing benefits from the ability of a DSL modem 115A-B to present, at different time instants, a nominal impedance (e.g., 100 ohms), an open, a short, or some other selectable termination.

As discussed above, the example termination circuit of FIG. 4 may be used together with a respective one of the example line probers 135A-D of FIGS. 1 and 2 and/or may be used together with one or more of the DSL modems 115A-B implemented by a DSLAM at either a CO or RT (e.g., the DSLAM 110). The example termination circuit of FIG. 4 may be implemented as part of the line coupling for a DSL modem and/or may be implemented as a standalone device communicatively coupled to a DSL modem. Moreover, in some DSLAM architectures it may be possible to share the example termination circuit across a plurality of DSL modems.

To provide a plurality of termination impedances, the example termination impedance circuit of FIG. 4 includes a plurality of terminations. Three example terminations 405, 410 and 415 are shown in FIG. 4. To select one of the plurality of terminations 405, 410 or 415, the example circuit of FIG. 4 includes a switch 420. As illustrated in FIG. 4, the plurality of terminations 405, 410 and 415 are connected to one side of a two-wire telephone line 425 with the example switch 420 selecting one of the plurality terminations 405, 410 or 415 to be connected to the other side of the two-wire telephone line 425.

Figure 5:
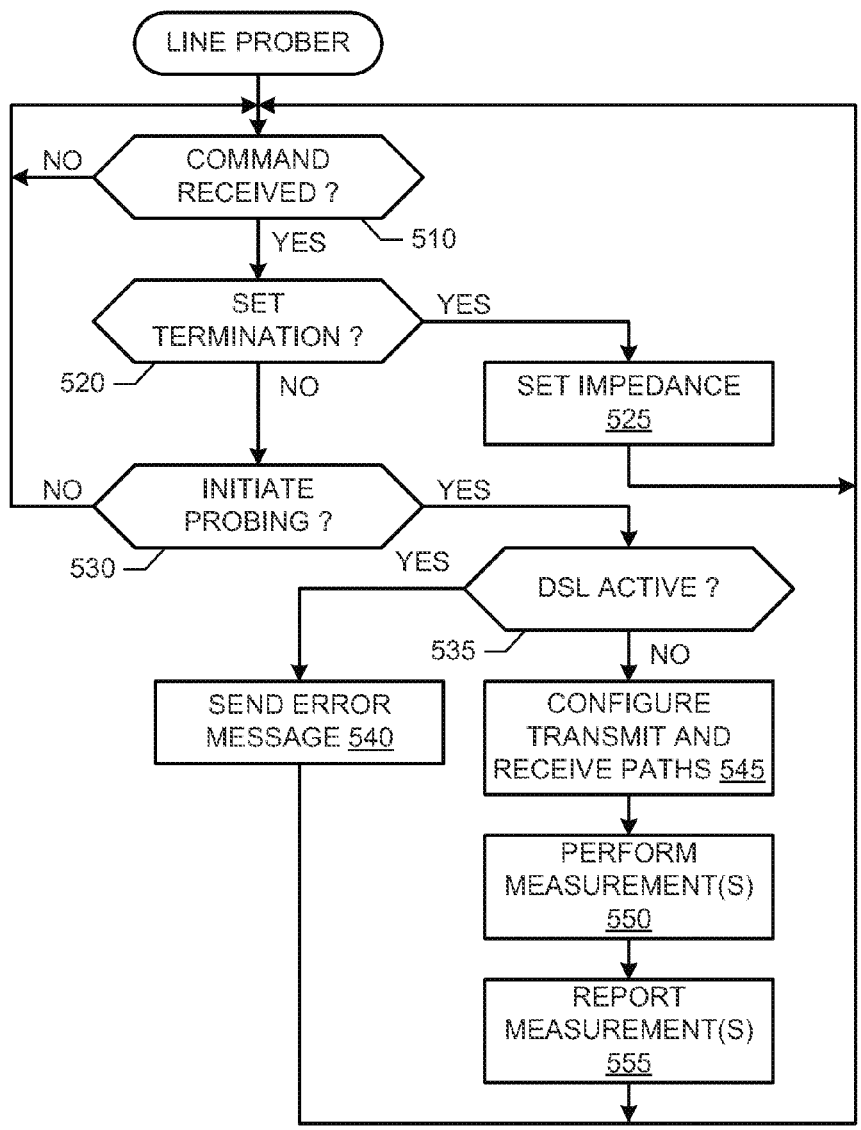
FIG. 5 is a flowchart representative of example machine accessible instructions that may be executed to implement one or more of the example line probers of FIGS. 1 and/or 2.
Figure 6:
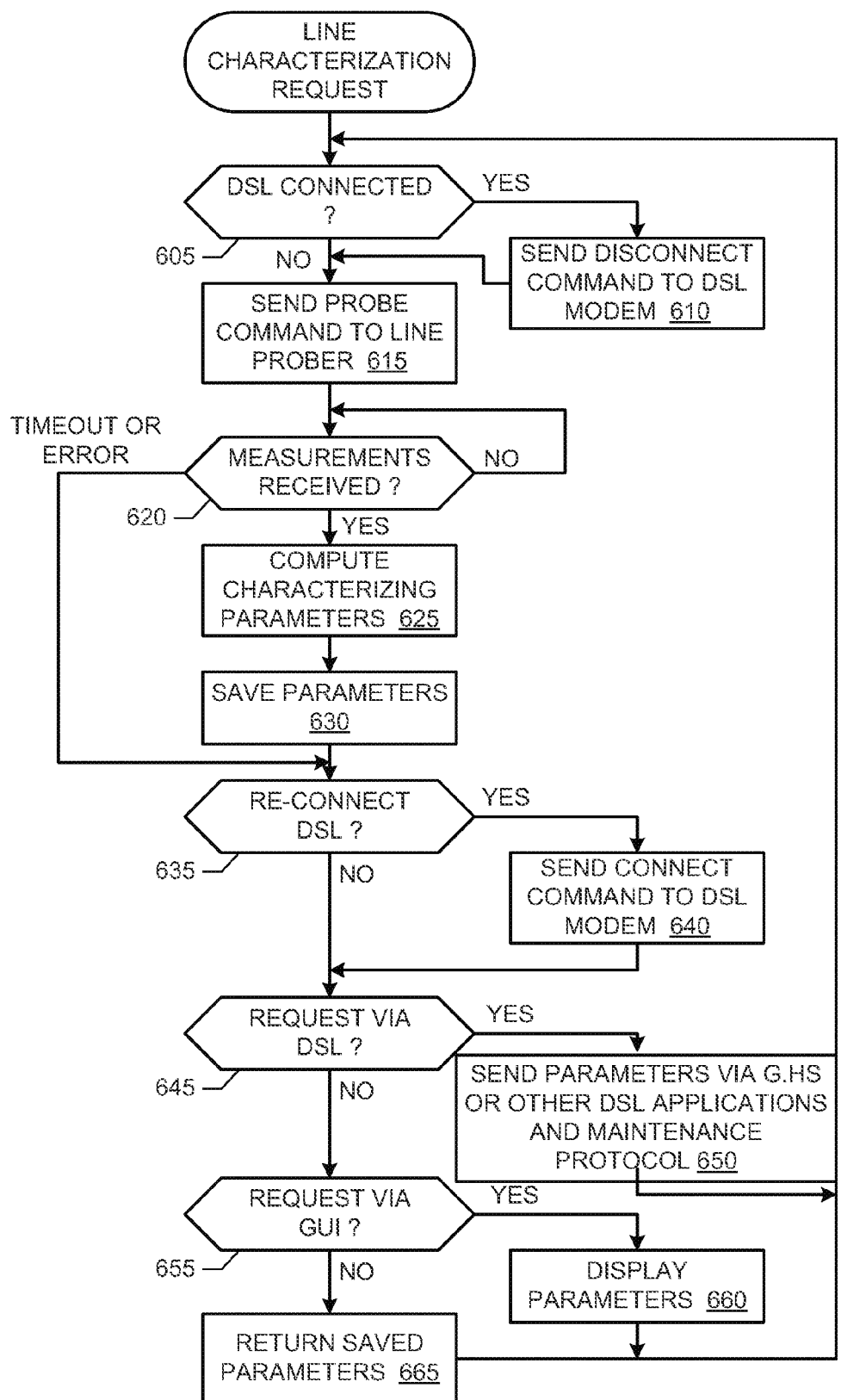
FIG. 6 is a flowchart representative of example machine accessible instructions that may be executed to implement one or more of the example data analyzers of FIG. 1.
Figure 8:
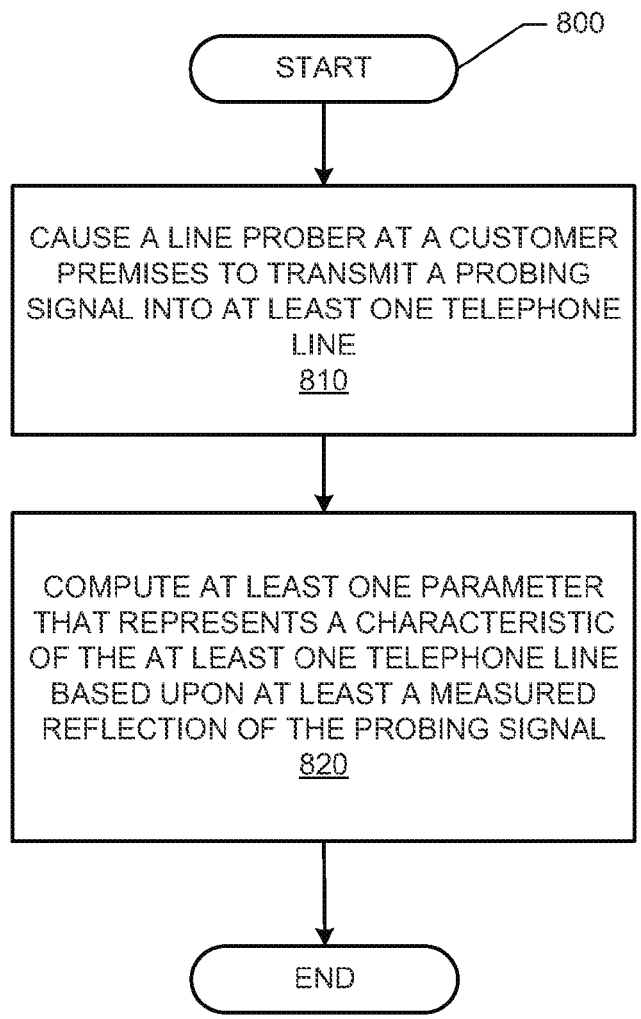
FIG. 8 is a flowchart of a method for computing at least one parameter representing a characteristic of at least one telephone line according to one exemplary embodiment.

FIGS. 5, 6 and 8 are flowcharts representative of example machine-accessible instructions that may be executed to implement the example line probers 135A-D and the example data analyzers 140A-D, respectively, of FIGS. 1 and/or 2. The example machine accessible instructions of FIGS. 5, 6 and/or 8 may be executed by a DSP, processor, a core, a controller and/or any other suitable processing device. For example, the example machine accessible instructions of FIGS. 5, 6 and/or 8 may be embodied in coded instructions stored on a tangible medium such as a flash memory, or RAM associated with a processor (e.g., the processor 310 shown in the example processor platform 300 and discussed below in conjunction with FIG. 3). Alternatively, some or all the example flowcharts of FIGS. 5, 6 and/or 8 may be implemented using an application specific integrated circuit (ASIC), a programmable logic device (PLD), a field programmable logic device (FPLD), discrete logic, hardware, firmware, etc. Also, some or all of the example flowcharts of FIGS. 5, 6 and/or 8 may be implemented manually or as combination(s) of any of the foregoing techniques, for example, a combination of firmware, software and/or hardware. Further, although the example machine accessible instructions of FIGS. 5-6 and 8 are described with reference to the flowcharts of FIGS. 5-6 and 8, persons of ordinary skill in the art will readily appreciate that many other methods of implementing the example line probers 135A-D and/or the example data analyzers 140A-D of FIGS. 1 and/or 2 may be employed. For example, the order of execution of the blocks may be changed, and/or some of the blocks described may be changed, eliminated, sub-divided, or combined. Additionally, persons of ordinary skill in the art will appreciate that the example machine accessible instructions of FIGS. 5, 6 and/or 8 may be carried out sequentially and/or carried out in parallel by, for example, separate processing threads, processors, devices, circuits, etc. Moreover, the machine accessible instructions of FIGS. 5, 6 and/or 8 may be carried out, for example, serially and/or in parallel with any other variety of machine accessible instructions, processes and/or operations.

The example machine accessible instructions of FIG. 5 begin with a line prober (e.g., the example controller 210 of FIG. 2) waiting to receive a command from a data analyzer (e.g., the example data analyzer 140A of FIG. 1) (block 510). If a command is received (block 510), the controller 210 determines if a command to set a termination impedance was received (block 520).

If a termination impedance set command was received (block 520), the controller 210 instructs a termination impedance circuit (e.g., the example circuit of FIG. 4) to set the impedance specified in the received command (block 525). If the command is not a termination impedance set command (block 520), the controller 210 determines if a command to initiate line probing was received (block 530).

If a command to initiate line probing was not received (block 530), control returns to block 510 to wait for another command to be received. If a command to initiate line probing was received (block 530), the controller 210 verifies that a DSL connection is not currently active on the telephone line (block 535). If a DSL connection is currently active on the telephone line (block 535), the controller 210 sends an error response to the data analyzer (block 540). Control then returns to block 510 to wait for another command to be received.

Returning to block 535, if a DSL connection is not currently active (block 535), the controller configures the transmit path (e.g., the example transmit path 212 of FIG. 2) and the receive path (e.g., the example receive path 237 of FIG. 2) based upon one or more parameters contained in the received command (block 545). The receive path 237 then implements the commanded measurements (block 550) and the measured data is returned to the data analyzer (block 555). Control then returns to block 510 to wait for another command to be received.

The example machine accessible instructions of FIG. 6 begin with a data analyzer (e.g., the example data analyzer 300 of FIG. 3) receiving a request to characterize, probe and/or test a telephone line. If a DSL connection is currently active on the telephone line (block 605), the data analyzer 140A sends a command to the DSL modem 115A to disconnect the DSL connection (block 610). If a DSL connection is not currently active (block 605), the data analyzer 140A skips sending the disconnect command.

The data analyzer 140A sends a probe command to the line prober associated with the telephone line (block 615) and then waits to receive measurement data from the line prober (block 620). If a timeout and/or error message is received while waiting (block 620), control proceeds to block 635. If measurement data is received (block 620), the data analyzer 140A determines and/or computes the requested telephone-line-characterizing parameter(s) (block 625) and saves the parameter(s) within the data analyzer (block 630).

If the DSL line was originally connected (block 605) and, thus, disconnected at block 610 (block 635), the data analyzer 140A instructs and/or commands the DSL modem 115A to re-establish and/or re-connect the DSL service (block 640). If the DSL line was not originally connected (block 635), the data analyzer skips reestablishing and/or re-connecting the DSL service.

If the line characterization and/or test request was received via the DSL service (block 645), the data analyzer sends the saved parameter(s) via G.hs (or the data analyzer sends an error response if a timeout or error message was received at block 620) (block 650). The saved parameter(s) may also be sent using any other in-band protocol employed by DSL transceivers for operations and maintenance (e.g. Embedded Operations Channel, clear Embedded Operations Channel, indicator bits, DSL diagnostic mode). If the line characterization and/or test request was received via a GUI (block 655), the data analyzer displays and/or presents the saved parameter(s) and/or a condensed ASCII code (or an error response if a timeout or error message was received at block 620) via the GUI (block 660). If the request was not received via the DSL service (block 645) or the GUI (block 655), the data analyzer 140A provides the saved parameter(s) (or an error response if a timeout or error message was received at block 620) via the communication method (e.g., voice-band modem) and/or communication network (e.g., PSTN) by which the request was received (block 665).

FIG. 8 is a flowchart of a method for computing at least one parameter that represents a characteristic of the at least one telephone line according to one exemplary embodiment. The method 800 although shown to begin at block 810 may begin at any point. As shown in block 810, the data analyzer 140A-D, located at a customer premises 110, causes the transmission of a probing signal (i.e. via instructions 700) into at least one telephone line 105. As shown in block 820, the data analyzer 140A-D computes a parameter that represents a characteristic of the at least one telephone line 710 based upon at least a measured reflection of the probing signal.

Of course, persons of ordinary skill in the art will recognize that the order, size, and proportions of the memory illustrated in the example systems may vary. Additionally, although this patent discloses example systems including, among other components, software or firmware executed on hardware, it will be noted that such systems are merely illustrative and should not be considered as limiting. For example, it is contemplated that any or all of these hardware and software components could be embodied exclusively in hardware, exclusively in software, exclusively in firmware or in some combination of hardware, firmware and/or software. Accordingly, persons of ordinary skill in the art will readily appreciate that the above described examples are not the only way to implement such systems.

At least some of the above described example methods and/or apparatus are implemented by one or more software and/or firmware programs running on a computer processor. However, dedicated hardware implementations including, but not limited to, an ASIC, programmable logic arrays and other hardware devices can likewise be constructed to implement some or all of the example methods and/or apparatus described herein, either in whole or in part. Furthermore, alternative software implementations including, but not limited to, distributed processing or component/object distributed processing, parallel processing, or virtual machine processing can also be constructed to implement the example methods and/or apparatus described herein.

It should also be noted that the example software and/or firmware implementations described herein are optionally stored on a tangible storage medium, such as: a magnetic medium (e.g., a disk or tape); a magneto-optical or optical medium such as a disk; or a solid state medium such as a memory card or other package that houses one or more read-only (non-volatile) memories, random access memories, or other re-writable (volatile) memories; or a signal containing computer instructions. A digital file attachment to e-mail or other self-contained information archive or set of archives is considered a distribution medium equivalent to a tangible storage medium. Accordingly, the example software and/or firmware described herein can be stored on a tangible storage medium or distribution medium such as those described above or equivalents and successor media.

To the extent the above specification describes example components and functions with reference to particular devices, standards and/or protocols, it is understood that the teachings of the invention are not limited to such devices, standards and/or protocols. For instance, DSL, ADSL, VDSL, HDSL, G.hs, Ethernet, DSPs, IEEE 802.11x, and IEEE 802.3x represent examples of the current state of the art. Such systems are periodically superseded by faster or more efficient systems having the same general purpose. Accordingly, replacement devices, standards and/or protocols having the same general functions are equivalents which are intended to be included within the scope of the accompanying claims.

Although certain example methods, apparatus and articles of manufacture have been described herein, the scope of coverage of this patent is not limited thereto. On the contrary, this patent covers all methods, apparatus and articles of manufacture fairly falling within the scope of the appended claims either literally or under the doctrine of equivalents.

What is claimed is:

1. An apparatus comprising:
a data analyzer located at a customer premises, the data analyzer comprising a line prober operative to transmit a probing signal and in response receive a measured reflection of the probing signal, the data analyzer operative to:
cause the line prober to transmit the probing signal into a customer premises end of at least one telephone line,
provide to at least one of: a digital subscriber line (DSL) modem, a residential gateway, and a loop tester, located at the customer premises, at least one parameter that represents a characteristic of the at least one telephone line based upon at least the measured reflection of the probing signal,
receive from a download server, instructions to provide the parameter that represents the characteristic of the telephone line based upon the measured reflection of the probing signal; and
communicate with a digital subscriber line (DSL) maintenance device that is geographically separate from at least one of the data analyzer and the line prober, wherein the DSL maintenance device is operative to request from the data analyzer the provided parameter, and in response:
instruct the line prober to transmit the probing signal,
transmit the probing signal, measure the reflected probing signal, and compute the parameter.

2. An apparatus as in claim 1, wherein the data analyzer is disposed in subscriber equipment.

3. An apparatus as in claim 1, further comprising a line prober operative to transmit the probing signal and in response receive the measured reflection of the probing signal, wherein the line prober is disposed in at least one of:
the digital subscriber line (DSL) modem, the residential gateway and the loop tester, and
wherein the data analyzer is disposed in at least one of: a customer's personal computer, a DSL modem and a set-top box operatively coupled to the at least one the digital subscriber line (DSL) modem, the residential gateway, and the loop tester.

4. An apparatus as in claim 1, wherein the data analyzer comprises an output device operative to perform at least one of:
display the parameter and send the parameter to a maintenance device via at least one of: the line prober, an Internet connection and a public switched telephone network (PSTN).

5. An apparatus as in claim 1, wherein the line prober comprises:
a transmit path operative to form the probing signal;
a receive path operative to measure a reflection of the probing signal;
a hybrid operative to couple the probing signal to the telephone line and to couple the reflection of the probing signal from the at least one telephone line to the receive path;
a controller operative to control the transmit path and the receive path; and
an interface operative to provide the measured reflection of the probing signal to the data analyzer.

6. An apparatus as in claim 5, wherein the interface receives probing data, from the data analyzer, and the transmit path forms the probing signal based on probing data.

7. An apparatus as in claim 5, wherein the transmit path transmits the probing signal a plurality of times, and the receive path measures a corresponding plurality of reflected probing signals and at least sums the plurality of reflected probing signals.

8. An apparatus as in claim 1, further comprising a switch to select a termination impedance coupled to the telephone line.

9. An apparatus as in claim 1, wherein the line prober comprises a first line prober, and further comprising a second line prober located at a second customer premises and operative to transmit a probe signal on a second telephone line while the first line prober receives a signal, wherein the data analyzer is further operative to compute crosstalk from the second telephone line into the first telephone line.

10. An apparatus as in claim 9, wherein the DSL maintenance device is operative to request the provided parameter that represents a characteristic of the at least one telephone line from the data analyzer, and in response further cause at least one of:
instruct the first line prober to transmit the probing signal,
configure the second line prober to receive the probing signal,
compute the crosstalk.

11. The apparatus of claim 1, wherein the data analyzer is further operative to compute the parameter.

12. An apparatus as in claim 1, wherein the provided parameter is a first provided parameter,
wherein the data analyzer is further operative to:
instruct the line prober to transmit a probing signal into a second telephone line,
provide a second parameter that represents a characteristic of the second telephone line based upon a measured reflection of the probing signal from the second telephone line, and
select between the first and the second telephone line for the line prober to transmit the respective probing signal and to measure the respective reflection of the probing signal.

13. An apparatus as in claim 12, wherein the data analyzer receives instructions from the digital subscriber line (DSL) maintenance device to select between the first and the second telephone line.

14. A method comprising:
  causing a line prober located at a customer premises to transmit a probing signal into a customer premises end of at least one telephone line and in response receive a measured reflection of the probing signal;
  providing to at least one of: a digital subscriber line (DSL) modem, a residential gateway, and a loop tester, located at the customer premises, at least one parameter that represents a characteristic of the at least one telephone line based upon at least the measured reflection of the probing signal;
  receiving from a download server, instructions to provide the parameter that represents the characteristic of the telephone line based upon the measured reflection of the probing signal; and
  communicating with a digital subscriber line (DSL) maintenance device that is geographically separate from the line prober, wherein the DSL maintenance device is operative to request the provided parameter, and in response:
  instructing the line prober to transmit the probing signal,
  transmitting the probing signal, measuring the reflected probing signal, and
  computing the parameter.

15. A method as in claim 14, further comprising:
  determining that the telephone line is being used to transmit a digital subscriber line (DSL) signal; and
  sending a command to stop transmission of the DSL signal before providing the at least one parameter.

16. A method as in claim 14, wherein:
  the request for the at least one provided parameter is received via a graphical user interface (GUI); and
  further comprising displaying the at least one provided parameter via the GUI.

17. A method as in claim 14, wherein a modem in loop diagnostic mode causes the line prober to transmit the probing signal and causes providing the at least one parameter that represents the characteristic of the at least one telephone line.

18. An article of manufacture storing non-transitory machine accessible instructions that, when executed, cause one or more machines to:
  cause a line prober located at a customer premises to transmit a probing signal into a customer premises end of at least one telephone line, and in response receive a measured reflection of the probing signal;
  provide at least one parameter that represents a characteristic of the at least one telephone line based upon at least the measured reflection of the probing signal;
  receive from a download server instructions to provide the parameter that represents the characteristic of the telephone line based upon the measured reflection of the probing signal; and
  communicate with a digital subscriber line (DSL) maintenance device that is geographically separate from the line prober, wherein the DSL maintenance device is operative to request the provided parameter, and in response:
  instruct the line prober to transmit the probing signal,
  transmit the probing signal, measure the reflected probing signal, and
  compute the parameter.

19. The method of claim 14, wherein the line prober comprises a first line prober, and further comprising:
  causing a second line prober located at a second customer premises to transmit a probing signal on a second telephone line while the first line prober receives a signal on the first telephone line;
  computing crosstalk on the first telephone line responsive to causing the second line prober to transmit a probing signal on the second telephone line.

\* \* \* \* \*